United States Patent
Amos

(10) Patent No.: US 6,555,811 B1
(45) Date of Patent: Apr. 29, 2003

(54) SCANNING CONFOCAL OPTICAL MICROSCOPE SYSTEM

(75) Inventor: William Bradshaw Amos, Cambridge (GB)

(73) Assignee: Medical Research Counsel, London (GB)

(*) Notice: Subject to any disclaimer, the term of this patent is extended or adjusted under 35 U.S.C. 154(b) by 0 days.

(21) Appl. No.: 09/786,546

(22) PCT Filed: Jul. 15, 1999

(86) PCT No.: PCT/GB99/02284
§ 371 (c)(1),
(2), (4) Date: Apr. 9, 2001

(87) PCT Pub. No.: WO00/31577
PCT Pub. Date: Jun. 2, 2000

(30) Foreign Application Priority Data

Nov. 19, 1998 (GB) .............................................. 9825267

(51) Int. Cl.[7] .................................................. H01J 3/14
(52) U.S. Cl. ...................................... 250/234; 350/326
(58) Field of Search ................................ 250/234–236; 356/326, 317–318, 301, 419, 310, 328

(56) References Cited

U.S. PATENT DOCUMENTS

| | | | |
|---|---|---|---|
| 5,032,720 A | 7/1991 | White | 250/236 |
| 5,192,980 A | 3/1993 | Dixon | 356/326 |
| 5,886,784 A * | 3/1999 | Engelhardt | 356/326 |

FOREIGN PATENT DOCUMENTS

| | | |
|---|---|---|
| EP | 0 327 425 | 8/1989 |
| GB | 2 299 235 | 9/1996 |
| JP | 08043739 | 2/1996 |
| WO | WO 95/07447 | 3/1995 |

* cited by examiner

*Primary Examiner*—Kevin Pyo
*Assistant Examiner*—Seung C. Sohn
(74) *Attorney, Agent, or Firm*—Barnes & Thornburg

(57) ABSTRACT

A confocal scanning optical microscope system wherein a dispersive optical device such as a prism separates an image from a restricted area of a specimen into a spread of images of differing wavelengths. Different parts of the spread of images are focused at respective beam-limiting apertures which are conjugate with one another, and the spectrally differing beams passing through the beam-limiting apertures pass to respective detectors.

9 Claims, 2 Drawing Sheets

SCANNING CONFOCAL OPTICAL MICROSCOPE SYSTEM

FIELD OF THE INVENTION

This invention relates to a scanning confocal optical microscope system.

BACKGROUND OF THE INVENTION

The confocal scanning optical microscope is now widely used. In its essentials it consists of a means for focussing a beam of light to a small spot on a specimen and means for collecting the emitted or reflected emission from that spot in order to build up an image by systematic scanning of the spot over a specimen. A defining feature of the confocal instrument is the presence of a beam-limiting aperture in front of the detector, which serves to limit detection of emitted light to that emerging from the immediate vicinity of the focus of illumination. White, in U.S. Pat. No. 5 032 720, taught the use of a variable iris as such an aperture, allowing a compromise to be sought between best optical depth discrimination, which is obtained with the aperture maximally closed, and high signal strength, which is obtained with it open. An analysis of this advantage has been published by Sandison et al, pp 39–51 in Handbook of Biological Confocal Microscopy, IInd Edn., Plenum Press, New York and London, 1995. White also taught the division of the emitted light in a confocal microscope into more than one beam according to wavelength, by means of chromatic reflectors. This principle has proved to have many applications, chiefly in the imaging of a plurality of fluorescent stains simultaneously present in the same specimen.

In a widely-used commercial form of White's instrument, there are two or three such beams, each passing light to a separate variable iris, i.e. there are two or three confocal beam-limiting apertures. The value of having more than one aperture is that the diameter may be set differently in each. This is of value because the above-mentioned compromise may be sought according to the brightness of each individual stain. Also, the theoretical optimum width of the aperture scales with wavelength, so a single diameter can never be precisely optimum for all wavelengths (van der Voort, H. T. M. & Brakenhoff, G. J. (1990), J. Microscopy 158, pp 43–54).

In White's microscope system, the separation of beams is achieved by the use of chromatic reflectors and further colour separation is achieved by means of barrier filters. Since it is accepted to be desirable to be able to distinguish colours, the use of a spectrometer in the emission path of a confocal microscope is an obvious development. Brakenhoff, in a diagram published on page 189 of Confocal Microscopy, edited by T. Wilson, Academic Press 1990, showed how a spectrometer could be used. FIG. 1 of the accompanying drawings is redrawn from Brakenhoff's figure and serves to clarify the placement of components in a confocal microscope.

In FIG. 1, light from a laser 11 is passed through a lens 12 and a first aperture, consisting of a pinhole 13, from which the light emerges as an expanding beam which is rendered parallel by lens 14. From lens 14 the light is reflected by chromatic reflector 15 so that it passes into a microscope objective lens 16 and is brought to a focus, normally as a diffraction-limited spot on a specimen at 17. Some of the light emitted from the specimen passes into lens 16 and the chromatic performance of the reflector 15 is chosen such that the emitted light is transmitted by this reflector 15 rather than reflected. The transmitted beam passes through a barrier filter 18, which absorbs unwanted laser light, and is focussed by the lens 19 on a confocal aperture at 20. It is essential for the proper functioning of a confocal microscope that this aperture lies in an optically conjugate position to the focus on the specimen; in other words the specimen is focussed on this aperture. In conventional optical terminology, the confocal aperture is an image plane stop.

FIG. 1 shows how the light which has passed through the confocal aperture at 20 is passed, in Brakenhoff's scheme, through a spectral dispersing means, such as a monochromator 21, and the outgoing light is finally passed to a unitary detector such as a photomultiplier tube 22. The photocurrent in the photomultiplier tube 22 is used as a measure of the intensity of the light in the range of wavelengths selected by the monochromator 21 and allows the construction of an image in computer memory if the spot of light is scanned systematically over the specimen.

In order to be able to record images from the spectrometer (photomultiplier tube 22) at more than one wavelength simultaneously, it is a possible development of the system proposed by Brakenhoff that the spectrometer should be of the multichannel type. This was proposed explicitly by Engelhardt in PCT Application WO 95/07447. This combination of the known art of spectrometry with known apparatus for confocal microscopy works well and has the advantage of being more flexible than the fixed-reflector design taught by White. It is, however, inferior to White's design in that a plurality of confocal apertures, each for a different wavelength range, cannot be used. Since all the detected light is passed through a single confocal aperture the previously mentioned advantages of multiple apertures are lost.

The present invention aims to overcome this difficulty, allowing the use of multiple confocal apertures in conjunction with multichannel spectral detection. It effectively consists of a form of imaging spectrometer, which is simple in construction and easily integrated into a scanning confocal optical microscope system.

The Invention

According to one aspect of the invention, there is provided a scanning confocal microscope system which is confocal in operation, the system including a dispersive optical means which produces from the same restricted region of a specimen a plurality of separated optical images of differing wavelength ranges, and a beam-limiting aperture for each said image, all said apertures being located at foci which are conjugate with each other. All the apertures are located in image planes which are conjugate with the plane of focus in the specimen, and the central points of the apertures are conjugate with the point of illumination in the specimen. The above-mentioned beam-limiting image plane apertures function as confocal apertures.

Preferably, the restricted region or area of the specimen is imaged at a primary image plane and the dispersive optical means, in conjunction with focussing means, produces said images of differing wavelength ranges in secondary image planes conjugate with the primary image plane.

The system preferably includes a plurality of detectors receiving light through the respective beam-limiting apertures.

According to another aspect of the invention, there is provided a scanning confocal optical microscope system comprising a scanning confocal optical microscope which produces a beam of light forming an image of a restricted region of a specimen in a primary image plane, a dispersive optical means which receives the beam from the said primary image plane and produces, in secondary image planes each conjugate with the primary image plane, a plurality of separated secondary optical images of the same region of the specimen, said secondary images respectively comprising light of differing ranges of wavelengths, a beam-limiting aperture in each secondary image plane and a plurality of detectors receiving light through the respective beam-limiting apertures.

Preferably, the beam-limiting area of at least one of the beam-limiting apertures is adjustable or variable. This may be achieved by exchange of a beam-limiting aperture of one size by an aperture of a different size, or by making the beam-imiting area adjustable in size, e.g. in width or diameter. For example, at least one beam-limiting aperture may comprise a variable iris diaphragm, a system of movable jaws, or an adjustable slit.

The dispersive optical means may comprise one or more optical prisms or a diffraction grating or gratings, but an equivalent device or devices may alternatively be employed.

Conveniently, a focusing means such as a lens reproduces the image in the primary image plane in the aperture plane of a second focusing means, e.g. a lens, whereby the aperture or exit pupil of the first focusing means is imaged at a location beyond the dispersive optical means (i.e. the dispersive means is located between the second focusing means and said location), whereby a spread of spectrally differing images of the aperture of the first focusing means is generated.

Conveniently, an optical beam-separating means, such as a reflector or reflectors, may be provided, whereby to direct the light from different points of the spread of spectrally differing images to the beam-limiting apertures, at which are formed a spatially spread series of images of the primary image plane, each confined to a wavelength range different to the wavelength range at the other beam-limiting apertures. The beam-separating means may be adjustable to enable variation of the wavelength range of the image at each beam-limiting aperture. As well as the beam-separating means, a further focusing means may be provided to generate the relayed images at the said confocal apertures.

A further reflector or reflectors or other further optical beam-separating means may serve to spatially spread the relayed images.

The wavelength compositions of the spectrally spread images may be variable, as by adjustment of the beam-separating means, e.g. the reflector or reflectors, and/or by the positioning of wavelength-sensitive absorbing screens or filters into the path or paths of the spectrally spread images.

DESCRIPTION OF EMBODIMENT

In accordance with the invention there is provided a modification of a scanning confocal optical microscope of conventional design. The known and conventional parts correspond to those parts of the light path shown in FIG. 1 up to the point where the light emitted from the specimen enters lens 19. The modification is shown in FIG. 2.

Figure 1:
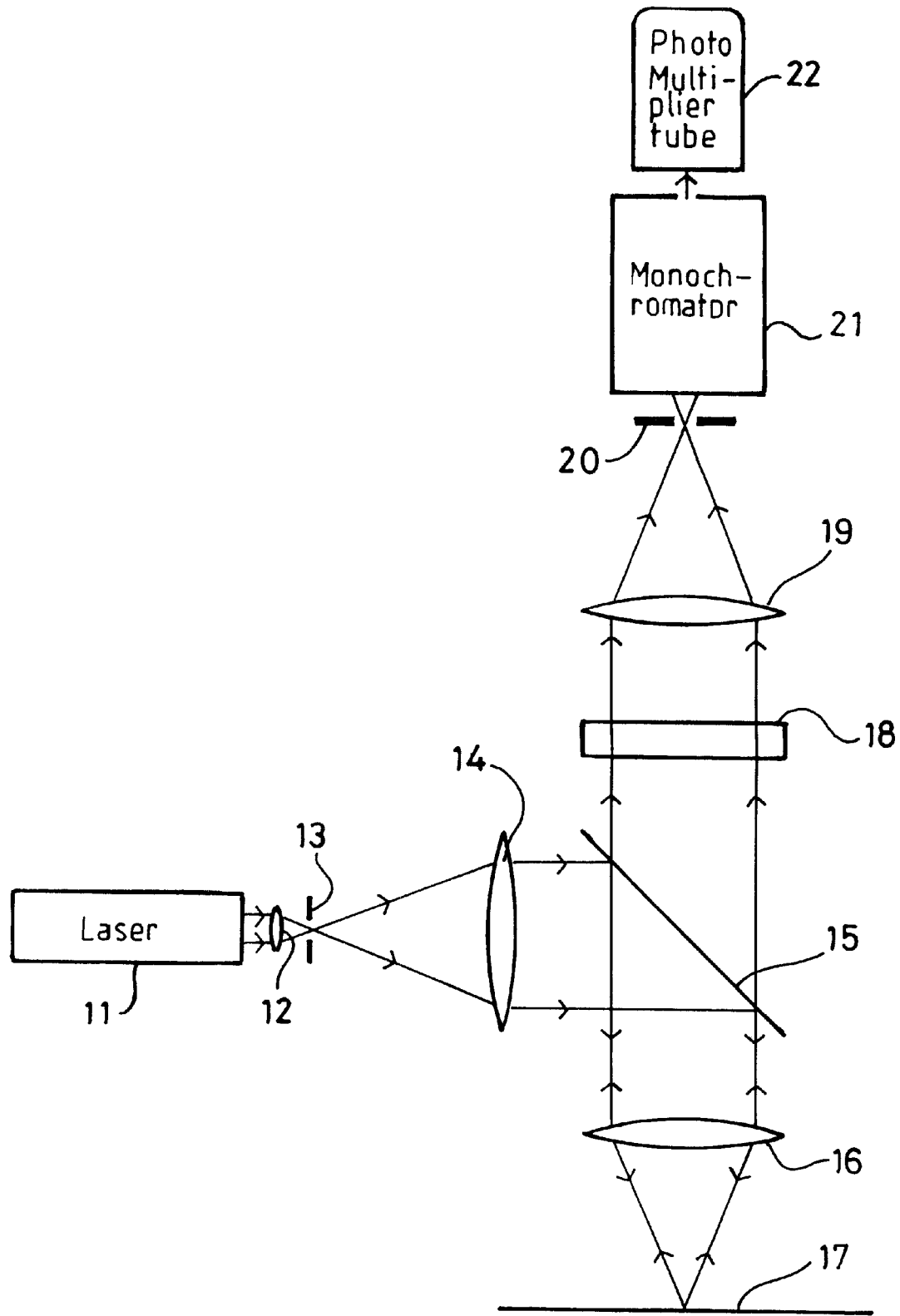
FIG. 1 is illustrative of the prior art.
Figure 2:
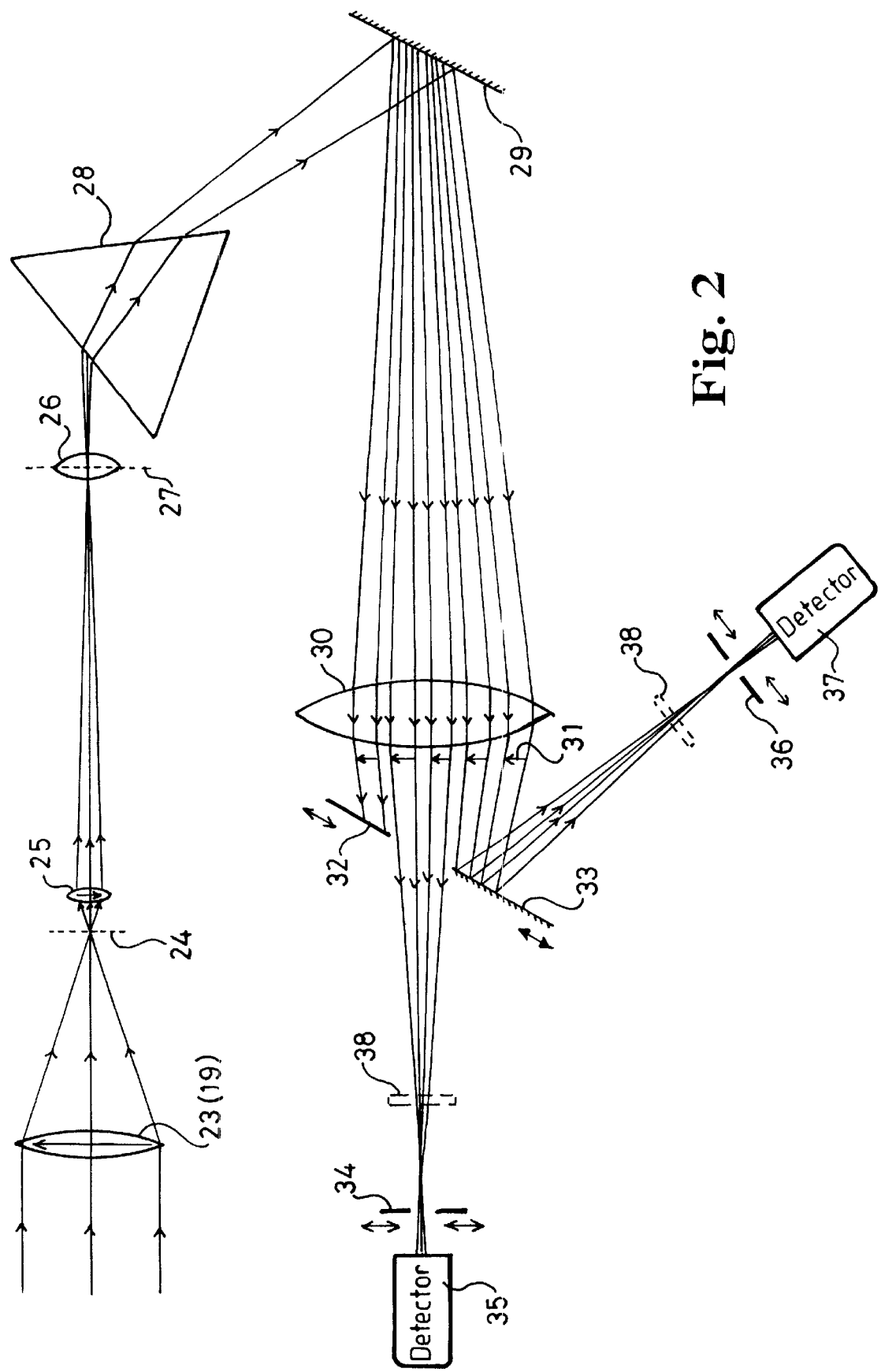
FIG. 2 illustrates an embodiment of scanning confocal optical microscope system in accordance with the present invention.

In FIG. 2, light from the specimen is shown entering lens 23, which occupies a position in the confocal microscope equivalent to that of lens 19 in FIG. 1. The lens 23 focusses the light from a point in the specimen to a point situated in an image plane 24 (the primary image plane). From plane 24 the light passes into another lens 25 of shorter focal length than lens 23, which relays an enlarged image of the point focus in plane 24 to a plane 27 which is conjugate with the plane of focus within the specimen and which lies in the aperture of lens 26. From the lens 26 the light passes through a dispersing means, consisting of a prism, compound prism or multiple prisms or diffraction grating, symbolised in the diagram by the prism 28. Reference 29 symbolises an optional reflector or plurality of reflectors, which might be used at any point in the light path to produce a folding of the beam convenient for packing the apparatus into a small space. The light then passes to a lens 30 and within this lens, or in the close vicinity of the lens, an optical spectrum, consisting of a linearly dispersed spread of images of the beam in the aperture of the lens 25 is produced by the focusing action of the lens 26 coupled with the dispersing action of the dispersing means 28.

In FIG. 2, multiple images are indicated by the small vertical arrows at 31 and are shown as discrete; in reality, the light would ordinarily be composed of a continuous range of wavelengths, so the images would be infinite in number and any single point in the series at 31 would be illuminated by overlapping images. As is well known in the art of spectroscopy, the resolution of this projected spectrum is greater the smaller the angular extent of one monochromatic image in relation to the angular dispersion according to wavelength. Close to the plane of the images at 31 (i.e. the planes of spectral focus) lie adjustable beam-separating means, symbolised by an opaque baffle 32 and a plane reflector 33. Light of wavelengths corresponding to one end of the spectrum falls upon the baffle 32 and is absorbed. Light of the middle region of the spectrum passes between the baffle 32 and the reflector 33 and is brought to an image-plane focus at a secondary image plane containing aperture 34. The plane of this aperture contains a focussed image of the specimen and aperture 34 therefore functions as a confocal aperture controlling the passage of light to a detector 35.

Light from the other end of the spectrum is reflected by the reflector 33 and is brought to a focus at a secondary image plane containing aperture 36, which is a second confocal aperture controlling the passage of light to detector 37. An image of the specimen is formed at aperture 36 similar to that at aperture 34, except that it is composed of different colours, according to the wavelength range selected by altering the position of the reflector 33 and the baffle 32. The apertures 34 and 36 are situated at foci which are conjugate with each other and with the primary focus at image plane 24. Alternatively or additionally, optical filters 38 may be incorporated in the light paths leading to the apertures 34 and 36.

Embodiments of the invention are envisaged in which reflectors are used to subdivide the spectrum in other ways, for instance into more than two segments, which, by the use of additional baffles, may be delimited further and made non-contiguous. Embodiments are also envisaged which contain more than two confocal detectors, each with its own independently variable aperture.

In a particular construction of the embodiment of FIG. 2, the beam entering the lens 23 has a maximum diameter of 2 mm, depending on the exit pupil diameter of the objective lens in use. The ratio of focal lengths of the lens 23 to the lens 25 was 18:1, with the result that the beam diameter at the aperture of lens 25 was nominally $2/18$ or 0.11 mm. The lens 26 was an achromatic doublet of focal length 100 mm used to produce an image of the aperture of the lens 25 at unit magnification in the plane of the spectrum 31. This image, if formed with monochromatic light, had a nominal size of 0.11 mm. The dispersing means 28 was an equilateral prism of high -dispersion flint glass which gave a spectrum extending 25 mm from violet (450 nm) to red (650 nm). The nominal resolution in this spectrum, neglecting diffraction effects and astigmatism, is 0.9 nm, which is more than sufficient for the separation of currently-used fluorescent dyes.

When the reflector 33 and the baffle 32 were withdrawn from the system, all the light transmitted by the lens 30 was passed to the aperture 34. When white light from a tungsten-halogen source was then passed into the microscope, the image of the characteristic region of the specimen at aperture 34 was white in colour. When the reflector 33 was inserted by translating it in the plane of the reflecting surface an image of the same region of the specimen as seen at aperture 34 appeared in the plane of the confocal aperture at 36, but was coloured relatively uniformly red, this being the colour of the portion of the spectrum reflected by the reflector 33. At the same time, the image at aperture 34 assumed the complementary hue (blue-green) because it received all wavelengths but red.

What is claimed is:

1. A scanning confocal optical microscope system comprising a scanning confocal optical microscope which produces a beam of light forming an image of a restricted region of a specimen in a primary image plane (24), a dispersive optical means (28) which receives the beam from the said primary image plane and produces a linearly dispersed spectral spread of imaging light, focussing means (30) for forming secondary images of the same region of the specimen, from different regions of said spectral spread of imaging light, a beam-limiting aperture (34, 36) in each secondary image plane and a plurality of detectors (35, 37) receiving light through the respective beam-limiting apertures (34, 36).

2. A system according to claim 1, wherein each beam-limiting aperture (34, 36) is adjustable in size.

3. A system according to claim 2, wherein each beam-limiting aperture (34, 36) comprises a variable iris diaphragm.

4. A system according to claim 1, wherein the dispersive-optical means (28) comprises at least one optical prism.

5. A system according to claim 1, wherein a first lens (25) reproduces the image in the primary image plane (24) in the aperture plane of a second lens (26), whereby the linearly dispersed spread of imaging light is generated at a location beyond the dispersive optical means (28).

6. A system according to claim 1, including an optical beam-separating means (32, 33) for directing focussed light from different points of the spread of spectrally differing images to the beam-limiting apertures (34, 36), at which are formed a spatially spread series of images of the primary image plane, each confined to a wavelength range different to the wavelength range at the other beam-limiting apertures (34, 36).

7. A system according to claim 6, wherein the beam-separating means (32, 33) is adjustable to enable variation of the wavelength range of the image at each beam-limiting aperture (34, 36).

8. A system according to claim 6, including optical filter means (38) in at least one of the paths of light forming the spatially spread series of images.

9. A system according to claim 1, wherein optical redirection means (29) acts to fold the light path or paths between the primary image plane and the detectors.

* * * * *